Aug. 22, 1933.  F. J. JARVIS  1,923,211
BEARING
Filed Feb. 12, 1930
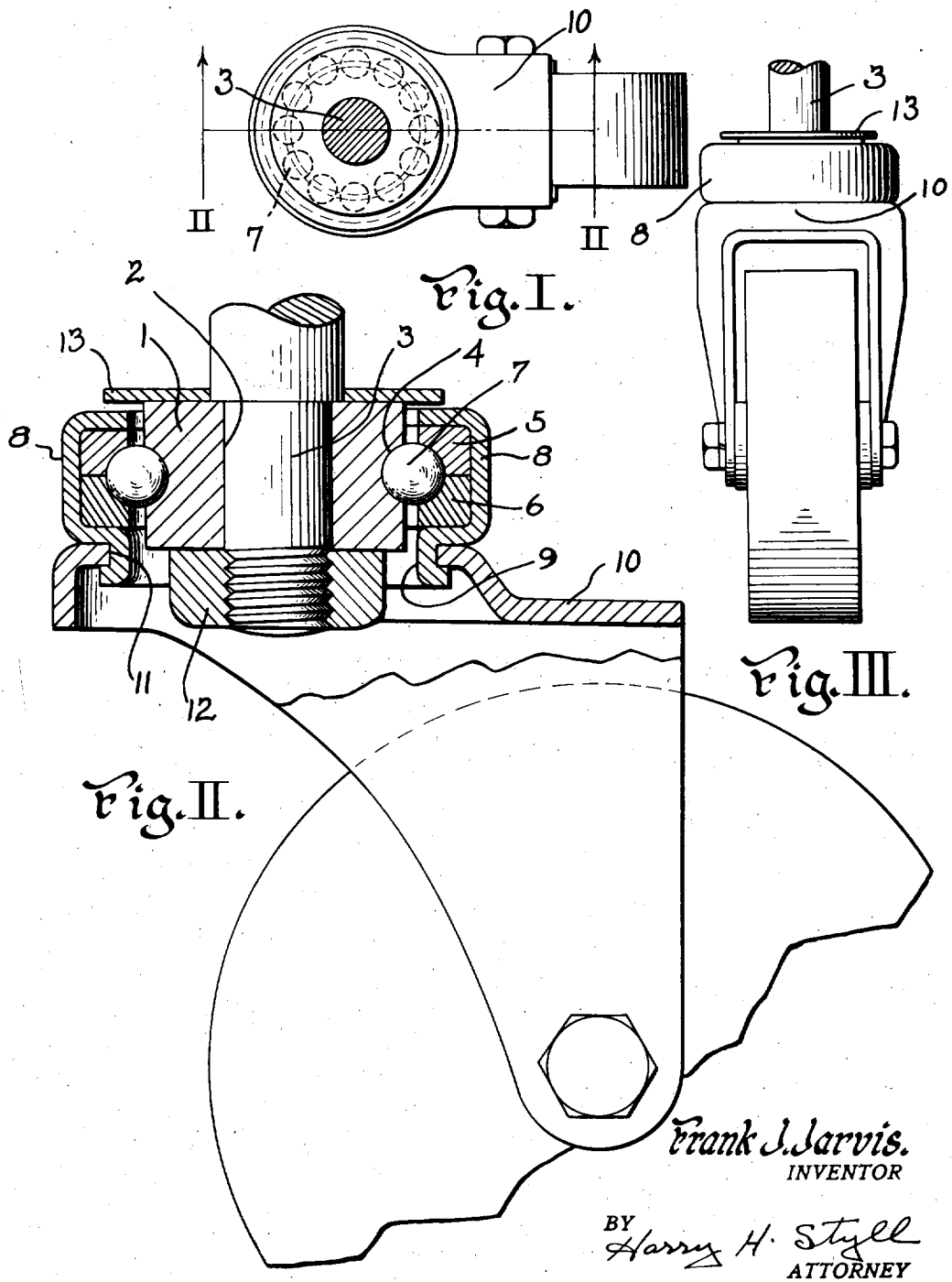
Frank J. Jarvis.
INVENTOR
BY Harry H. Styll
ATTORNEY Patented Aug. 22, 1933

1,923,211

UNITED STATES PATENT OFFICE 1,923,211

BEARING

Frank J. Jarvis, Palmer, Mass., assignor to Jarvis & Jarvis, Inc., Palmer, Mass., a Corporation of Massachusetts Application February 12, 1930. Serial No. 427,825

2 Claims. (Cl. 308—196)

This invention relates to improvements in bearings and has particular reference to compressible means for holding and securing a bearing and to the process of producing the same.

The principal object of the invention is to provide improved ductile or compressible means for holding the bearing together and for securing the bearing in working position.

Another object of the invention is to provide an improved process of securing the bearing together and in place on the work.

Another object of the invention is to provide an improved ferrule for holding the parts of the bearing in place and for securing it to the work.

Another object of the invention is to provide an improved soft shell casing for holding the bearing together and for securing it to the work.

Another object of the invention is to provide improved means so that the bearing shaft or fixture can be applied or installed after the bearing assembly has been made, thereby greatly increasing its application and adaptability.

Another object of the invention is to provide improved means whereby both a radial and a thrust bearing can be produced at closer limits.

Another object of the invention is to provide improved means whereby the bearing can be more economically produced and more economically attached to the work.

Another object of the invention is to provide improved means whereby the bearing may be assembled and secured to the work without case hardening the complete unit with great advantage in production, assembling and attaching.

Another object of the invention is to provide improved means whereby the bearing shaft may be secured either by bolt or riveting without affecting the rotation of the bearing.

Other objects and advantages of the invention will be apparent from the following description taken in connection with the accompanying drawing. It will be apparent that many changes in the arrangement of parts, the details of construction and the steps of the process may be made without departing from the spirit of the invention as expressed in the accompanying claims. I, therefore, do not wish to be limited to the exact details shown and described as the preferred forms and steps of the process only have been shown by way of illustration.

Referring to the drawing:

Fig. I is a top or plan view of the invention applied to a caster fork or bracket;

Fig. II is a cross section of Fig. I taken on line II—II; and

Fig. III is a front elevation of the invention shown in Fig. I and Fig. II.

In the past it has been the practice to split the bearing or race members of ball, roller and similar bearings so that the central or internal portion of the bearing was not solid or unitary, making necessary expensive and cumbersome attaching means for the bearing shaft or pin. Also expensive and difficult means had to be provided to secure the bearing in place on the work.

It is, therefore, one of the prime advantages of my invention that a solid or unitary central portion is provided by which the bearing shaft or pin may be simply and inexpensively secured in place either by a threaded nut or by riveting without interfering with the rotative action of the bearing and that the parts may be securely held in position and attached to the work by a simple, inexpensive, soft shell or ferrule spun over the bearing parts and spun to the work, thereby decreasing the cost and greatly improving the action and range of the device.

Referring to the drawing in which similar reference characters refer to corresponding parts throughout, the bearing proper comprises the central or inner bearing member or race 1 which is cylindrical or annular in form and has the central opening 2 for the bearing shaft or pin 3, and also the circumferential ball race or groove 4 around its outer periphery; a split outer bearing or race member comprising the rings 5 and 6 separated on the central line of the ball groove or race, a portion of which extends into each ring; and the bearing balls or bearing members 7 lying in the ball races or grooves in the inner and outer bearings. Spun or otherwise shaped over the outer bearing rings is the ferrule or shell 8 which holds the bearing parts in place. This ferrule or shell is of relatively ductile or compressible material which may be spun or compressed into place. The shell 8 has the extending lip or flange 9 on its under side. The bearing is shown attached to the fork or roller bracket of a caster. The top section 10 of the bracket has the hole or opening 11 therein. The lip or flange 9 of the shell extends through the opening 11 and is spun, flanged or compressed over the inner side of the bracket plate, as indicated in Fig. II. The compression is such as to secure the bearing securely to the bracket plate or work. This securing is a simple inexpensive spinning or compressing operation. The bearing shaft or pin 3 may then be inserted in place in the opening 2 of the inner bearing and secured by the nut 12 or if desired it may be riveted in place or otherwise secured.

The character 13 indicates a protective or finishing washer placed over the bearing and surrounding the bearing shaft or pin. It is clear that the bearing shaft is tightly secured to the inner bearing member 1 and rotates therewith.

With the solid inner bearing member it is clear that the bearing is operative both as a thrust bearing and as a radial or lateral bearing.

In operation the ferrule or shell holds the bearing relatively fixed with respect to the bracket or work whilst the bearing shaft or pin rotates with the inner bearing member. The bearing members are secured together in relative position by the shell or ferrule spun or compressed thereover and the bearing is secured to the work by the flange 9 on the shell or ferrule extending through the opening 11 in the work and spun or compressed over the edges thereof.

With this construction of a solid inner bearing, a split outer bearing and a shell spun or compressed over the outside of the bearing and spun or compressed to the work, any stem or bearing shaft can be applied after the complete assembly has been performed, thereby giving it an extremely wide range of application. Such a bearing is both a radial and a thrust bearing which can be made to closer limits than prior practice. The bearing may be made by bearing manufacturers and then assembled readily to the work without case hardening the whole unit, a matter of great and important advantage and the bearing shaft or pin may be secured in many ways owing to the solid central or inner bearing.

From the foregoing it will be seen that I have provided a simple, inexpensive device for carrying out all the objects of the invention and a simple, inexpensive process of producing the same and applying it to the work.

Having described my invention, I claim:

1. A bearing comprising an annular inner race member with an axial opening therethrough and with a ball race around its periphery, outer annular ball race means having a ball race around its inner surface comating with the race in the inner member, bearing balls in the aligned races and a ductile binder plate pressed over the two ends and the outer periphery of the outer race means, the portion at one end being extended in a direction substantially parallel with the axis of the axial opening in the bearing, said extension being of length sufficient to permit its outer end being bent back parallel to the portion engaging the adjacent end of the outer bearing and towards the periphery thereof to leave a space intervening between said bent end and the portion engaging the adjacent end of the outer bearing means.

2. A bearing comprising an annular inner member with an axial opening therethrough and with a ball race around its periphery, outer annular ball race means having a ball race around its inner surface comating with the race in the inner member, bearing balls in the aligned races and a ductile binder plate pressed over the two ends and the periphery of the outer race means, the portion at one end being extended in a direction substantially parallel with the axis of the axial opening in the bearing, thence bent outwardly towards the periphery of the outer race means in a direction parallel with the portion thereof engaging the adjacent end of the outer race means and spaced therefrom.

FRANK J. JARVIS.